US009073038B2

(12) United States Patent
Carr et al.

(10) Patent No.: US 9,073,038 B2
(45) Date of Patent: Jul. 7, 2015

(54) CARBON COATED SILICA PARTICLES AND METHODS OF MAKING SAME

(75) Inventors: Peter W. Carr, St. Paul, MN (US); Alon V. McCormick, Minneapolis, MN (US); Changyub Paek, Owasso, OK (US)

(73) Assignee: Regents of the University of Minnesota, Saint Paul, MN (US)

( * ) Notice: Subject to any disclaimer, the term of this patent is extended or adjusted under 35 U.S.C. 154(b) by 128 days.

(21) Appl. No.: 13/699,992

(22) PCT Filed: May 26, 2011

(86) PCT No.: PCT/US2011/038095
§ 371 (c)(1),
(2), (4) Date: Mar. 7, 2013

(87) PCT Pub. No.: WO2011/150179
PCT Pub. Date: Dec. 1, 2011

(65) Prior Publication Data
US 2013/0157846 A1 Jun. 20, 2013

Related U.S. Application Data

(60) Provisional application No. 61/348,506, filed on May 26, 2010.

(51) Int. Cl.
| B01J 20/20 | (2006.01) |
| B32B 5/16 | (2006.01) |
| C01B 33/12 | (2006.01) |
| C01B 33/18 | (2006.01) |
| B01J 20/283 | (2006.01) |
| B01J 20/286 | (2006.01) |
| B01J 20/32 | (2006.01) |
| B01J 20/02 | (2006.01) |
| B01J 20/10 | (2006.01) |

(52) U.S. Cl.
CPC ............... *B01J 20/20* (2013.01); *C01B 33/18* (2013.01); *C01P 2006/12* (2013.01); *C01P 2006/16* (2013.01); *B01J 20/283* (2013.01); *B01J 20/286* (2013.01); *B01J 20/3204* (2013.01); *B01J 20/3236* (2013.01); *B01J 20/324* (2013.01); *B01J 20/3289* (2013.01); *B01J 20/0211* (2013.01); *B01J 20/0229* (2013.01); *B01J 20/103* (2013.01); *B01J 20/0248* (2013.01)

(58) Field of Classification Search
USPC .................................. 427/212; 428/403, 404
IPC . C01B 33/18,33/12; C07C 17/25; C12N 13/00; A61K 49/06; B01J 13/00, 23/04; B32B 5/16; B01D 15/08
See application file for complete search history.

(56) References Cited

U.S. PATENT DOCUMENTS

| 5,108,597 A | 4/1992 | Funkenbusch et al. |
| 5,182,016 A | 1/1993 | Funkenbusch et al. |
| 5,254,262 A * | 10/1993 | Funkenbusch et al. ....... 210/656 |
| 5,271,833 A | 12/1993 | Funkenbusch et al. |
| 5,346,619 A | 9/1994 | Funkenbusch et al. |
| 5,368,833 A * | 11/1994 | Johansson et al. ............ 423/338 |
| 5,712,037 A * | 1/1998 | Anderson et al. ............. 428/404 |
| 2005/0151278 A1* | 7/2005 | Lefenfeld et al. ......... 260/665 R |
| 2008/0213189 A1* | 9/2008 | Lee et al. ..................... 424/9.32 |

FOREIGN PATENT DOCUMENTS

WO WO 2011/150179 A2 12/2011

OTHER PUBLICATIONS

C.Park et al. Journal of Chromatography, 1218(2011) pp. 1359-1366; Jan. 5, 2011.*
Aiken et al., "Preparation and properties of uniform mixed and coated colloidal particles," *J. Mater. Sci.*, Mar. 1990; 25(3):1886-1894.
Barrett et al., "Retention behavior of morphine and its metabolites on a porous graphitic carbon column," *Chromatographia*, Jun. 1998; 47(11-12):667-672.
Barrett et al., "The determination of pore volume and area distributions in porous substances. 1 computations from nitrogen isotherms." *J. Am. Chem. Soc.*, Jan. 1951; 73(1):373-380.
Bourrat et al., "Low Temperature Pyrocarbons: A Review," *J. Braz. Chem. Soc.*, 2006; 17(6):1090-1095.
Brunauer et al., "Adsorption of gases in multimolecular layers," *J. Am. Chem. Soc.*, Feb. 1938; 60(2):309-319.
Cserhati, "Carbon-based sorbents in chromatography. New achievements." Biomed. Chromatogr., Feb. 2009, 23;(2):111-8.
Di Corcia et al., "Graphitized carbon black extraction cartridges for monitoring polar pesticides in water," *Anal. Chem.*, 1993; 65(7):907-912.
Di Corcia et al., "Gas chromatographic separations of monoterpene hydrocarbons on modified graphitized carbon black," J. of Chromatography A, May 11, 1978; 152(1):63-67.
Engel et al., "Liquid chromatography based on a low temperature method of producing glassy carbon," *Anal. Chem.*, 1993; 65(24):3691-3700.
Forgacs et al., "Separation of steroidal drugs on porous graphitized carbon column," *J. Pharm. Biomed. Anal.*, Oct. 1998, 18(1-2):15-20.
Forgacs et al., "Retention of some ring-substituted aniline derivatives by porous graphitized carbon. Dependence on physico-chemical parameters," *Chromatographia*, Apr. 1992; 33(7-8):356-360.
Gierak et al., "Preparation of carboneous adsorbents by catalytic decomposition of hydrocarbons for chromatographic application," *J. Chromatogr.*, 1989; 483:197-207.

(Continued)

*Primary Examiner* — Leszek Kiliman
(74) *Attorney, Agent, or Firm* — Mueting, Raasch & Gebhardt, P.A.

(57) ABSTRACT

Methods using homogeneous precipitation of a metal on a surface of a particle to prepare silica particles having the metal adsorbed thereon are disclosed herein. In certain embodiments, the silica particles having the metal adsorbed thereon can be used to prepare carbon coated silica particles. The carbon coated silica particles can be useful in a wide variety of applications including, for example, for use as sorbents in chromatography.

22 Claims, 6 Drawing Sheets

(56) References Cited

OTHER PUBLICATIONS

Guenu et al., "On-line sample handling of water-soluble organic pollutants in aqueous samples using porous graphitic carbon," *J. of Chromatography A*, Apr. 15, 1994; 665(2):243-251.

International Preliminary Report on Patentability and Written Opinion, issued Nov. 27, 2012, for International Patent Application No. PCT/US2011/038095; 7 pgs.

International Search Report, mailed Feb. 17, 2012, for International Patent Application No. PCT/US2011/038095, filed May 26, 2011; 5 pgs.

Jackson et al., "Study of polar and nonpolar substituted benzenes and aromatic isomers on carbon-coated zirconia and alkyl bonded phases," *J. Chromatogr. A*, 2002; 958:121-9.

Jackson et al., "Improving reversed-phase liquid chromatography," *Chemtech.*, 1998; 28:29-37.

Jackson et al., "Diastereomeric selectivity of carbon-coated zirconia reversed-phase liquid chromatographic media." *Anal. Chem.*, Dec. 1997, 15; 69(24):5011-5017.

Jackson et al., "Intermolecular interactions involved in solute retention on carbon media in reversed-phase high-performance liquid chromatography," *Anal. Chem.*, 1997; 69(3):416-425.

Jerkovich et al., "The Use of Micrometer-Sized Particles in Ultrahigh Pressure Liquid Chromatography," *LCGC North Am.* 2003; 21(1).

Kamegawa et al., "Carbon coating of silica surface: 1. Pyrolysis of silica gels esterified with alcohols," *Colloid Interface Sci.*, Sep. 1993; 159(2):324-327.

Kirkland et al., "Superficially porous silica microspheres for fast high-performance liquid chromatography of macromolecules," *J. Chromatogr. A*, 2000; 890:3.

Knox et al., "Structure and performance of porous graphitic carbon in liquid chromatography," *J. Chromatogr.*, Feb. 21, 1986; 352:3-25.

Knox et al., "Kinetic Conditions for Optimum Speed and Resolution in Column Chromatography," *J.Chromatogr. Sci.*, Oct. 1969; 7:614.

Kung et al., "Preparation of oxide catalyst supports—a review of recent advances," *Chem. Eng. J.*, Nov. 1996; 64(2):203-214.

Laitinen, "Chemical Analysis," McGraw-Hill Book Company, Inc., New York, 1960, 138.

Langmyhr et al., "Idirect EDTA-Titration of Aluminium with Lead(II) Solutions and 4-(2-Pyridylazo)-Resorcinol (PAR) as Indicator," *Anal. Chem. Acta*, 1959; 20:524.

Leboda et al., "Effect of zirconium on preparation and sorption properties od complex carbon mineral adsorbents," *Mater. Chem. Phys.*, 1991; 30(2):83-91.

Leboda et al., "Preparation and modification of complex pyrolytic carbon-silica adsorbents," *Chromatogr.*, Sep. 1981; 14(9):524-528.

Melander et al., "Stationary phase effects in reversed-phase chromatography II. Substituent selectivities for retention on various hydrocarbonaceous bonded phases," *Chromatographia*, Feb. 1982; 15(2):86-90.

Paek et al., "New method for development of carbon clad silica phases for liquid chromatography: Part I. Preparation of carbon phases." *J. of Chromatography A*, Jan. 5, 2011;1218(10):1359-1366.

Paek et al., "Preparation and evaluation of carbon coated alumina as a high surface area packing material for high performance liquid chromatography." *J. of Chromatography A*, Oct. 15, 2010;1217(42):6475-83.

Paek et al., "Preparation of robust carbon coated alumina as a high surface area packing material for liquid chromatography," HPLC2008, May 2008 (Poster).

Paek et al., "Modification of porous alumina for liquid chromatography and surface characterization," Industrial partnership for research in interfacial and material engineering, May 2008 (Oral Presentation).

Paek et al., "Robust carbon coated substances as high surface area packing materials for liquid chromatography," Pittcon 2009, Mar. 2009 (Oral Presentation).

Poppe, "Some reflections on speed and efficiency of modern chromatographic methods," *J. of Chromatography A*, Aug. 1997, 22; 778(1-2):3-21.

Ross et al., "Carbon-based packing materials for liquid chromatography: Applications," *Adv. Chromatogr. (N.Y.)*, 1997; 37:121-62.

Stoll et al., "Fast, comprehensive online two-dimensional high performance liquid chromatography through the use of high temperature ultra-fast gradient elution reversed-phase liquid chromatography." *J. of Chromatography A*, Jul. 2006, 28; 1122(1-2):123-37. Available online May 23, 2006.

Tanaka et al., "Selectivity of carbon packing materials in comparison with octadecylsilyl- and pyrenylethylsilylsilica gels in reversed-phase liquid chromatography," *J. of Chromatography A*, 1991; 549:29-41.

Trammell et al., "A study of the Lewis acid-base interactions of vinylphosphonic acid-modified polybutadiene-coated zirconia." *Anal. Chem.*, Jul. 2001, 15; 73(14):3323-31.

Unger, "Porous carbon packings for liquid chromatography," *Anal. Chem.*, Mar. 1983; 55(3):361A-375A.

Wang et al., "A practical approach to maximizing peak capacity by using long columns packed with pellicular stationary phases for proteomic research." *J.Chromatogr. A*, Feb. 24, 2006; 1107(1-2):139-51.

Weber et al., "Chromatographic evaluation of porous carbon-clad zirconia microparticles," *Anal. Chem.*, 1995; 67(17):3042-3050.

Weber et al., "Comparison of isomer separation on carbon-clad microporous zirconia and on conventional reversed-phase high-performance liquid chromatography supports," *Anal. Chem.*, 1990;62(23):2620-2625.

Weber et al., "Evaluation of a zirconia-based carbon polymer composite reversed-phase chromatographic support," *J. Chromatogr.*, 1990; 519:31-52.

\* cited by examiner

CARBON COATED SILICA PARTICLES AND METHODS OF MAKING SAME

This application is a U.S. National Stage Application of International Application No. PCT/US2011/038095, filed on May 26, 2011, which claims the benefit of U.S. Provisional Application No. 61/348,506, filed May 26, 2010, both of which are incorporated herein by reference in their entireties.

GOVERNMENT FUNDING

This invention was made with government support under GM054585 awarded by the National Institutes of Health. The government has certain rights in the invention.

BACKGROUND

Carbonaceous materials are versatile sorbents used in a wide range of applications, most particularly, for gas and liquid chromatography (LC). Two commercial carbon phases for LC—carbon clad zirconia ($C/ZrO_2$) and porous graphitic carbon (Hypercarb)—among all the available reversed-phase materials show unique forms of chromatographic selectivity for polar and nonpolar compounds, as well as for structural isomers, and thus have been used to separate analytes that are not readily resolved by conventional reversed phases (e.g., alkyl silica phases).

The unique selectivity of $C/ZrO_2$, combined with its mechanical strength, make it a promising choice for use in fast two-dimensional liquid chromatography (2DLC), but there is still a great need to improve its retentivity. A carbon phase on porous HPLC grade alumina has been reported and the resulting material ($C/Al_2O_3$) showed 4-5-fold higher retentivity than did $C/ZrO_2$, while maintaining the unique selectivity of a carbon-like adsorbent. However, the further development of $C/Al_2O_3$ has been limited by the paucity of available varieties of HPLC grade porous aluminas.

New carbonaceous materials are needed as sorbents for chromatography.

SUMMARY

In one aspect, the present specification provides a method of preparing silica particles having metal adsorbed thereon. In some embodiments, the method includes: dispersing silica particles in an aqueous liquid having a pH of less than or equal to 7; adding a soluble source for one or more metal cations to the aqueous liquid having the silica particles dispersed therein; and increasing the pH of the aqueous liquid with the metal cations and the silica particles dispersed therein sufficiently slowly to provide homogeneous precipitation of the metal on a surface of the silica particles and form the silica particles having the metal adsorbed thereon. In certain embodiments, the silica particles are dispersed in an aqueous liquid having a pH of less than or equal to 4. Preferably, the silica particles having the metal adsorbed thereon are formed through molecular adsorption from homogeneous solution. Optionally, the method includes efficient mixing of the aqueous liquid during one or more of the method steps. Silica particles having metal adsorbed thereon prepared by such methods are also disclosed, and the disclosed methods may also include separating and/or drying the silica particles having the metal adsorbed thereon.

The one or more metal cations can be selected from nearly any metal except for alkali (i.e., Group I) metals and alkaline earth (i.e., Group 2) metals. For example, the one or more metal cations can be selected from rare earth cations, transition metal cations, post-transition metal cations, or combinations thereof. Exemplary metal cations include Al cations, Zr cations, Fe cations, and combinations thereof. The source for the one or more metal cations can be any metal compound that provides adequate solubility in the aqueous liquid. Useful metal compounds can include one or more inorganic anions (e.g., halides, nitrates, sulfates, and combinations thereof) and/or organic anions (e.g., formates, carboxylates, and combinations thereof).

In the methods described herein above, the pH of the aqueous liquid with the metal cations and the silica particles dispersed therein is increased sufficiently slowly to provide homogeneous precipitation of the metal on a surface of the silica particles and form the silica particles having the metal adsorbed thereon. Attempts to increase the pH with a concentrated strong base such as sodium hydroxide can cause the metal to locally precipitate as the metal hydroxide, resulting in agglomerates of the precipitated metal that can clog the pores of the silica. Conveniently, the pH of the aqueous liquid can be increased sufficiently slowly by adding a non-basic reagent that slowly reacts to generate or release a species that increases the pH. For example, urea can be added to solution, and upon slow warming will decompose (e.g., over a 1-2 hour period) to ammonia and carbon dioxide. This approach eliminates any localized pH differences that result in rapid precipitation of the metal and formation of agglomerates that clog pores. Once the ammonia has consumed all the acid, the metal adsorbs on the ionized silanol groups of the silica (i.e., adsorption from homogeneous solution).

In another aspect, the present specification provides a method of preparing carbon coated silica particles. In certain embodiments, the method includes: preparing silica particles having a metal adsorbed thereon by a method described herein; and depositing carbon on the silica particles having the metal adsorbed thereon using a chemical vapor deposition process. In some embodiments, the chemical vapor deposition process includes contacting the silica particles having the metal adsorbed thereon with an organic vapor under conditions effective to form the carbon coated silica particles. In some embodiments, the organic vapor includes one or more hydrocarbons (e.g., one or more C1-C12 hydrocarbons such as hexane). Exemplary conditions effective to form the carbon coated silica particles include a temperature of at least 500° C., in some embodiments a temperature of at least 600° C., and in other embodiments a temperature of at least 700° C. Carbon coated silica particles prepared by such methods are also disclosed, and the disclosed methods may also include separating and/or drying the carbon coated silica particles.

In another aspect, the present specification provides a carbon coated silica particle including: a silica particle; two monolayers or less (and in some embodiments one monolayer or less) of aluminum (III) cations on the surface of the silica particle; and a layer of carbon deposited over the aluminum (III) cations on the surface of the silica particle, wherein the carbon coated silica particle includes 15 to 50 wt. % carbon. In some embodiments, the carbon coated silica particle includes 20 to 40 wt. % carbon, and in certain embodiments 25 to 35 wt. % carbon. In some embodiments, the size of the silica particle is 0.1 to 50 micrometers, and in certain embodiments 1 to 20 micrometers.

In another aspect, the present specification provides sorbents (e.g., solid phase extraction sorbents, liquid chromatography sorbents, and/or gas chromatography sorbents) including one or more carbon coated silica particles as described herein.

Definitions

Unless otherwise specified, "a," "an," "the," and "at least one" are used interchangeably and mean one or more than one.

As used herein, the term "comprising," which is synonymous with "including" or "containing," is inclusive, open-ended, and does not exclude additional unrecited elements or method steps.

As used herein, the size of silica particles is intended to refer to the diameter for spherical particles. For non-spherical silica particles, the size refers to the largest dimension of the particle.

The above brief description of various embodiments of the present invention is not intended to describe each embodiment or every implementation of the present invention. Rather, a more complete understanding of the invention will become apparent and appreciated by reference to the following description and claims in view of the accompanying drawings. Further, it is to be understood that other embodiments may be utilized and structural changes may be made without departing from the scope of the present invention.

DETAILED DESCRIPTION OF ILLUSTRATIVE EMBODIMENTS

Owing to its combination of unique selectivity and mechanical strength, commercial carbon clad zirconia (C/$ZrO_2$) has been widely used for many applications, including fast two-dimensional liquid chromatography (2DLC). However, the low surface area available (only 20-30 m$^2$/g for commercial porous $ZrO_2$) limits its retentivity. A carbon phase coated on the high surface area of HPLC grade alumina (C/$Al_2O_3$) has been reported. Although this material can provide higher retentivity and comparable selectivity, its use is limited by the lack of availability of HPLC quality types of alumina particles (e.g., particle size, surface area, and pore size).

Silica is the most common substrate as a HPLC packing materials and is available in a wide variety of types (e.g., totally porous and superficially porous), pore sizes, surface areas and particle diameters (e.g., sub 2 to greater than 10 µm). This variety allows its application in wide array of separations. For example, particularly small particles can be used for fast separations, whereas superficially porous particles can be used to improve the speed and efficiency of peptide separations.

Though there have been many attempts to develop carbon phases on silica, none is yet entirely satisfactory for demanding HPLC uses such as fast 2DLC. Hypercarb, made from silica 'template' has insufficient mechanical strength and ought not to be used above 300 bar. Carbon phases on silica prepared by a variety of methods including (i) pyrolyzing organic vapors such as dichloromethane; (ii) pyrolyzing silica pre-coated with a crosslinked polymer layer; and (iii) pyrolyzing silica having diethynyl aromatic oligomers pre-adsorbed thereon have been found to be either unsuitable for HPLC and/or exhibited both low efficiencies and significantly tailed peak shapes when used for chromatography.

Treatment of the silica surface with other metals can assist carbon deposition. The use of silica impregnated with nickel (II) and zirconium (IV) salts to catalyze the decomposition of hydrocarbons on silica has been reported; unfortunately, the high metal loading used caused a significant loss of surface area. In addition, deposition of the metal by impregnation can lead to uncontrolled precipitation and crystallization of the metal oxide and hydroxides, which can cause pore blockage.

Figure 1:
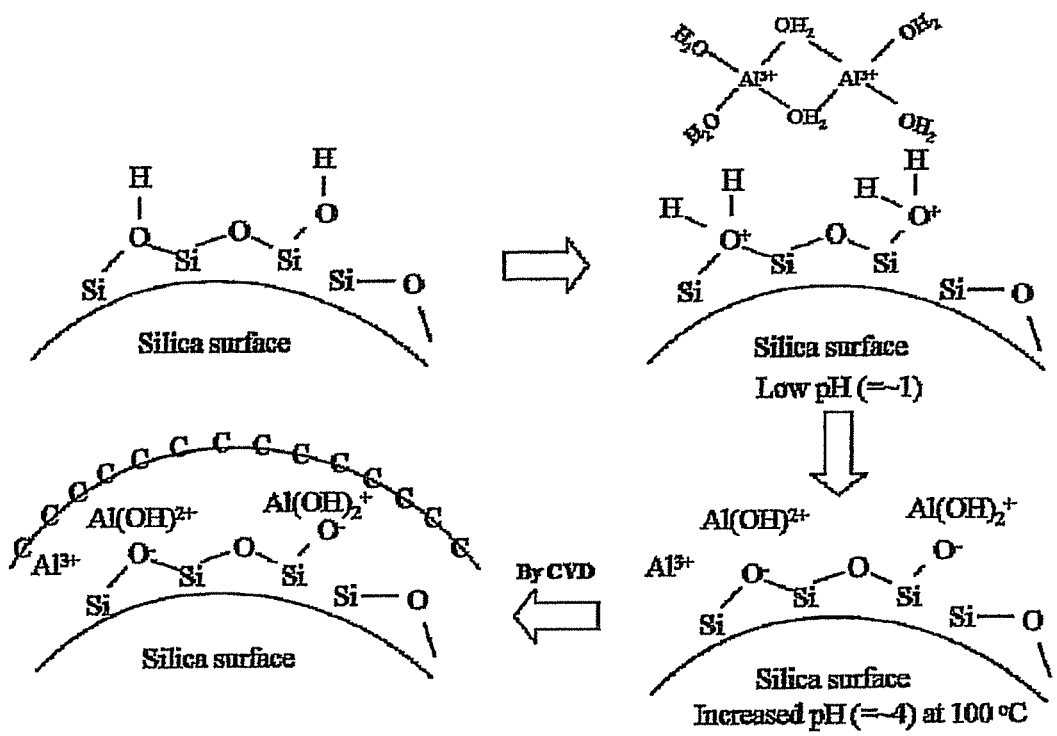
FIG. 1 is a schematic illustration for an embodiment of the reaction for aluminum (III) treatment (e.g., adsorption) of silica.

Disclosed herein is a method to prepare metal-adsorbed silica as a substrate for the development of carbon phases for use as HPLC media. In some embodiments, the method can put metals on silica in a regulated manner, and in certain embodiments limiting treatment to a monolayer of metal, prior to carbon deposition by CVD. A schematic diagram showing how exemplary reactions may proceed is illustrated in FIG. 1.

For example, to make the carbon phase on silica, the silica surface can first be treated with a monolayer or less of metal cations that bind to deprotonated silanols to provide catalytic sites for carbon deposition. The method uses the electrostatic binding between positively charged metal ions and deprotonated silanol groups, to enable the ability to limit the amount of metal to a monolayer or less. Homogeneous precipitation of metallic compounds (see, for example, Laitinen, Chemical Analysis, McGraw-Hill Book Company, Inc., New York, 1960, p. 138) was obtained by slow hydrolysis of urea in solution to homogeneously raise the pH so slowly that all cations adsorb onto the silica surface, thereby avoiding self-oligomerization and precipitation (see, for example, Aiken et al., *J Mater. Sci.* 25 (1990) 1886). The methods disclosed herein use Al (III)—a metal well known to produce on silica reactive sites that can produce carbon coatings ("coke" that can deactivate solid acid catalysts). See also, Paek et al., *J Chromatogr. A* 1218 (2011) 1359-1366.

After treatment with Al (III), a carbon phase can be formed on the surface by chemical vapor deposition (CVD), typically at elevated temperatures. For example, after Al (III) treatment, a carbon phase can be formed on the silica surface by chemical vapor deposition at 700° C. using hexane as the carbon source.

The amount of Al (III) on the surface can be varied to assess its effect on carbon deposition, and the carbon loading can be varied at different Al (III) levels to assess its effect on the chromatographic properties of the various carbon adsorbents. For example, the carbon loading can be varied by adjusting the reaction time on each substrate. Use of a concentration of Al (III) corresponding to a full monolayer can lead to a uniform carbon coating. For example, carbon deposition is more efficient and uniform when a full monolayer rather than a quarter monolayer of Al (III) is pre-deposited on the silica. In terms of its carbon deposition properties the more heavily Al (III) adsorbed silica behaves more similarly to pure alumina than does the lightly clad material.

Each carbon-clad Al (III) doped silica, hereinafter denoted C/Al/SiO$_2$, material can then be packed into a column to evaluate chromatographic performance including, for example, efficiency and retentivity. The resulting carbon materials offer good chromatographic efficiency and can be prepared reproducibly (3% standard deviation). A carbon coating sufficient to cover all the Al (III) sites, about 4-5 monolayers in this work, provided useful chromatographic performance.

The resulting carbon phases can act as reversed phases with reasonable efficiency (50,000-79,000 plates/m) for non-aromatic test species. The best chromatographic stationary phases were obtained with about 32% and 25% carbon on the quarter and one monolayer of Al (III) clad silica, respectively. These new carbon phases behave as reversed phases and provide higher retentivity than does C/ZrO$_2$. Given the chromatographic data, these new carbon stationary phases can be very useful as HPLC packing materials. Considering the wide variety of sizes and types of silica available, the method disclosed herein can provide a method for preparing a wide variety of carbonaceous materials for HPLC supports.

In summary a method to activate silica with metals for the deposition of a carbon surface for use as a liquid chromatographic media is disclosed herein. In certain embodiments, Al (III) (≤1 monolayer), the most effective metal tried, is chemically adsorbed on silica by interaction with deprotonated silanol groups on the surface of silica. Slow hydrolysis of urea to homogeneously generate metal hydroxides during the reaction was used. All Al (III) added to solution was fully adsorbed on the silica surface as confirmed by titration of the filtered solution and by ICP OES analysis of the particles. The present method provides a thin, uniform film of metallic species on silica as shown by the insignificant changes in pore structure upon deposition of the metallic species.

The present invention is illustrated by the following examples. It is to be understood that the particular examples, materials, amounts, and procedures are to be interpreted broadly in accordance with the scope and spirit of the invention as set forth herein.

EXAMPLES

HPLC grade hexanes from Sigma-Aldrich (St. Louis, Mo., USA) were used as the CVD carbon source. All chemicals used for the chromatographic study were obtained reagent grade or better from Sigma-Aldrich (St. Louis, Mo., USA). HPLC eluents were HPLC grade acetonitrile from Burdick and Jackson (Muskegon, Mich., USA) and HPLC grade water (18.2 MΩ) that was prepared in-house from a Barnstead Nanopure II deionizing system (Dubuque, Iowa, USA). Prior to use, this water was boiled to remove carbon dioxide and passed through a 0.45 µm nylon filtration apparatus (Lida Manufacturing Inc., Kenosha, Wis., USA).

The electrical conductivity of the carbon material was examined using the circuit as we described previously (e.g., Paek et al., *J. Chromatogr. A* 1217 (2010) 6475). Nitrogen sorption was measured using a Micromeritics ASAP 2000 sorptometer (Micromeritics, Norcross, Ga.); the specific surface area was computed using the BET method (e.g., Brunauer et al., *J. Am. Chem. Soc.* 60 (1938) 309), and pore size distributions were approximated using the BJH method (e.g., Barrett et al., *J. Am. Chem. Soc.* 73 (1951) 373).

Example 1

Preparation of Metal Adsorbed Silica

Aluminum chloride hexahydrate (Fisher Scientific, Fair Lawn, N.J., USA) was used for the Al (III) treatment. Silica, 13.7 µm AstroSil (Stellar Phases Inc, Yardley, Pa., USA) was used for the preliminary CVD study with Al (III) metal-treatments, and 5 µm Zorbax silica (Agilent Technologies, Palo Alto, Calif.) was used to prepare HPLC supports with Al (III) treatment.

For comparison, attempts were also made with Zr (IV) using zirconium tetrachloride (Sigma-Aldrich, St. Louis, Mo. USA), but we found Al (III) much more effective for carbon deposition.

C/ZrO$_2$ (3 µm, carbon loading=8%, w/w), used for comparison, was a generous gift of ZirChrom Separations Inc. (Anoka, Minn., USA).

The amount of metal chloride to be added was based on the surface area of silica measured by N$_2$ adsorption and the assumptions that there are about 8 µmol/m$^2$ silanol groups on the silica surface and that Al (III) would react with them in 1:1 ratio. The initial solution was strongly acidic (pH approximately 1, 0.1 mol/L HCl) to avoid oligomerization of metal cations and to ensure that silanol groups were not dissociated and some were positively charged. A large volume of solution was used to keep the metal concentration low (10-40 mmol/L) again to discourage oligomerization as the pH is raised. The silica slurry in 0.1 mol/L hydrochloric acid solution was prepared at 0.025% (w/v) by magnetically stirring in a round-bottomed flask to suspend the particles and then sonicating for 15 minutes to remove air from the pores of the silica. Then, the first half of the hydrochloric acid solution was added to the solution and stirred for 20 minutes. Subsequently, the second half of the hydrochloric acid solution with the requisite amount of aluminum chloride dissolved in it was slowly added in the center of the vortex. Finally, an excess of urea (0.5 mol/L) was added. The solution was rigorously stirred over the whole procedure.

The initial pH of the solution was 1-1.2 at 25° C. The solution was heated to boiling under reflux. Urea in the solution converts slowly to ammonia, producing a slow and homogeneous increase of the pH. This slow and well-mixed pH change, combined with the ample availability of negatively charged deprotonated silanols on the high surface area silica, prevents the buildup of dissolved metal species that are prone to oligomerization; this oligomerization could nucleate independent particles or, even worse, block pores in the silica.

The reaction was stopped (approximately 2 hours) as the pH reached 4-4.3 at 100° C. The slurry was quickly cooled to room temperature in an ice bath. After filtering the solution, it was washed with water (HPLC grade), and the particles were dried in a vacuum oven overnight at 100° C.

Metal-treated silica underwent elemental analysis by ICP OES (Geology Department, University of Minnesota). An indirect colorimetric titration method was used to determine the residual Al (III) in the suspending solution after the reaction; this method is described thoroughly elsewhere (e.g., Langmyhr et al., *Anal. Chim. Acta* 20 (1959) 524), but it is worthwhile here to review the key steps. An excess of EDTA (0.01 mol/L) is added to an Al (III) solution, and the excess EDTA is titrated by 0.01 mol/L $Pb(NO_3)_2$ using xylenol orange as an indicator. About 5% error in quantitation of Al (III) was obtained based on the triplicate trials of the titration of a standard Al (III) solution (0.005 mol/L in 0.25 mol/L HCl). Subsequently, titration of the filtered solution remaining after Al (III) treatment of silica showed that less than 5% of the Al (III) provided remained in solution. Except where noted, these results, as well as the ICP OES results, confirm that the Al (III) is quantitatively adsorbed onto the silica surface.

Example 2

Metal Adsorbed Silica with Different Amounts of Al (III)

Silca particles (5 μm, Zorbax) were treated with various amounts of Al (III) (2, 4 and 8 μm/m$^2$). Assuming 8 μmol/m$^2$ of silanol group as one monolayer these represent roughly quarter-, half- and full monolayer coverages of Al (III).

We also attempted to prepare a surface treated with 12 μmol/m$^2$, but this resulted in precipitation due to the presence of excess (non-adsorbed) Al (III) in solution when the pH reached values of 4.1. Modifying the treatment conditions by stopping the treatment at a lower final pH, i.e., 3.8 at 100° C. prevented nucleation of the excess Al (III) in the solution, but titration of the final solution showed excess Al (III) in the solution and indicated that only about 10 μmol/m$^2$ had adsorbed on the surface of silica. Since attempting such a high surface loading of Al (III) fails to allow quantitative adsorption and risks the formation of oligomerized species, which could plug pores or nucleate new particles, we limited our chromatographic study to 8 μmol/m$^2$ (a full monolayer) as the maximum amount of Al (III) treatment.

Figure 2:
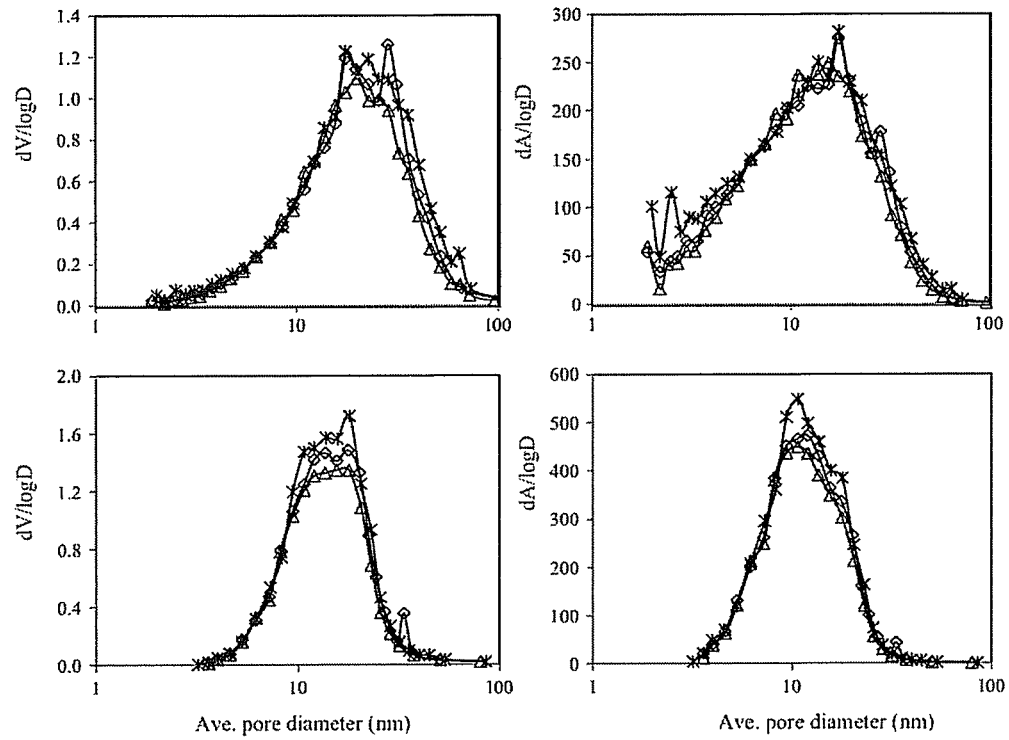
FIG. 2 is a graphical representation of the differential pore size distributions for pore volume and surface area for various carbon loads computed by the BJH method from nitrogen adsorption (upper) and desorption (lower) data. (*) $SiO_2$; ($\diamond$) half monolayer (4 µmol/m$^2$) Al/$SiO_2$; ($\Delta$) one monolayer (8 µmol/m$^2$) Al/$SiO_2$.

It is desirable to maintain the pore structure of silica after metal deposition. To confirm that Al (III) treatment did not affect the pore structure (i.e., that no oligomerization or precipitation of aluminum hydroxide plugged the pores) we conducted nitrogen sorptometry to monitor the effect of different amounts of Al (III) treatment (4 and 8 μmol/m$^2$) on the pore structure of silica. The surface area, pore volume and the average pore diameter show that the silica treated with 8 μmol/m$^2$ of Al (III) lost only 10% of its surface area and 14% of its pore volume, which is a reasonable loss as compared to the estimated volume decrease based on the assumption of density of aluminum hydroxide (2.4 g/cm$^3$). Compared to Leboda's result of the loss of 40% of the surface area after putting Zr (IV) on silica (Leboda et al., *Mater. Chem. Phys.* 30 (1991) 83), our method maintains a high surface area. In addition, the estimated pore size distributions in FIG. 2 show that the original pore structure of silica is well-maintained after the Al (III) treatment.

Example 3

Carbon Deposition

Chemical vapor deposition (CVD) was used to deposit carbon on the metal-treated silicas. The apparatus and process are described in detail elsewhere (e.g., Paek et al., *J. Chromatogr. A* 1217 (2010) 6475).

In brief, the particles were placed in a baffled quartz reactor in an oven (HTR 11/75, Carbolite, Aston Lane, Hope, England) that oscillates between 0 and 180° to mix the particles during the CVD process. The CVD can be conducted at 700° C. for 6 hours or more using hexanes (thermostated at 0° C.) as a carbon source. For example, hydrocarbon (e.g. hexanes) vapor was introduced by the flow of high purity nitrogen (99.99% purity) through a reservoir of the organic liquid and passed over the particle at 700° C. for 6 hours or more to deposit carbon on the surface. After each batch, the resulting material was sent to Atlantic Microlabs (Norcross, Ga., USA) for the determination of its carbon content).

We obtained very low carbon load (approximately 2% (w/w)) on bare silica by the CVD at 700° C. for 6 hours using hexane as a carbon source. Dichloromethane can provide high carbon load on silica without any catalyst. Accordingly, we used it as a carbon source for the CVD. However, the resulting material was not chromatographically useful as it gave very poor peak shapes, although we were able to get over 30% of carbon loads. We also attempted to deposit carbon on silica by pyrolyzing a crosslinked polymer layer. Silica coated with highly crosslinked polymer network (Trammell et al., *Anal. Chem.* 73 (2001) 332) was heated at 700° C. under nitrogen flow. This method provided higher carbon load than did the CVD on bare silica, but we lost about 40% of initial carbon after pyrolysis. We could further increase carbon loading by introducing hexane vapor during the pyrolysis; however, its chromatographic performance was unsatisfactory as shown by low plate counts and poor peak shapes.

We initially treated silica (13.7 μm) with Zr (IV) and Al (III) using our method to compare the effectiveness of carbon deposition. ICP-AES analysis for metal contents agreed with the amount we added for reaction. In addition, titration of residual solution after reaction also ensured all metal was fully adsorbed on silica. Subsequently, the same CVD condition (700° C., 6 hours) was applied to both metal treated silica. We found Al (III) is more effective for carbon deposition, which led us to use of Al (III) to treat 5 μm silica particles for development of HPLC packing materials.

Example 4

Effect of Al (III) Treatment on Carbon Deposition

Figure 3:
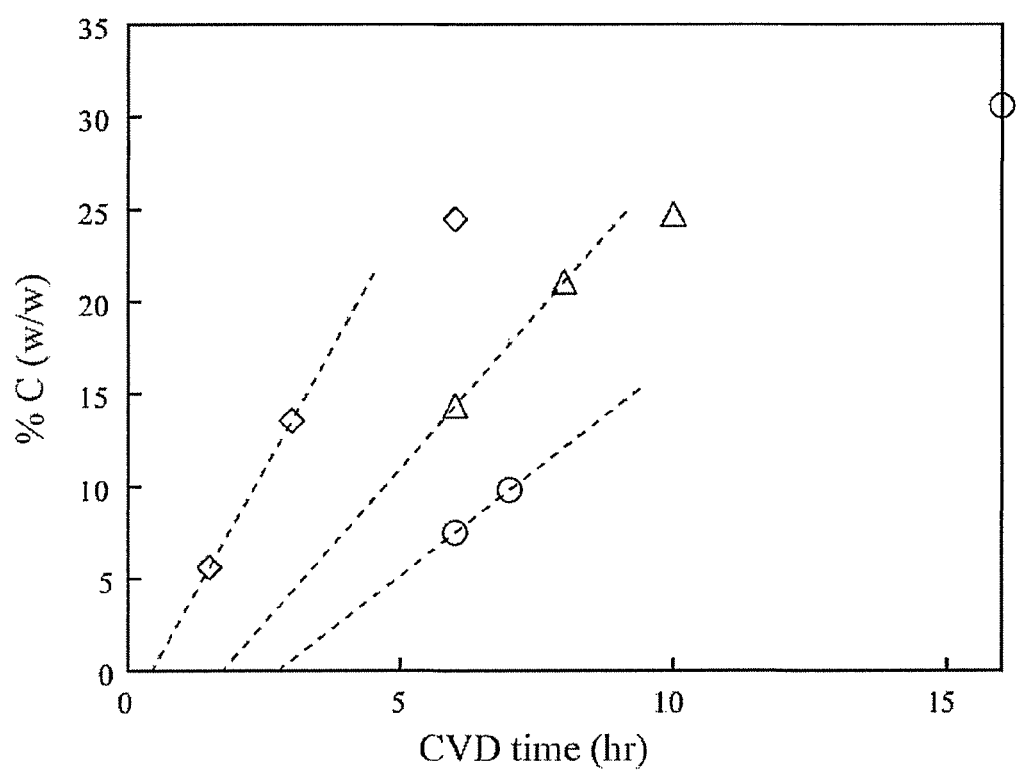
FIG. 3 is a graphical representation of an embodiment plotting carbon loading (% C, w/w) vs. CVD time for alumina ($\diamond$), 8 µmolAl/$SiO_2$ ($\Delta$), and 2 µmolAl/$SiO_2$ ($\bigcirc$). The arrow is to help compare induction times between 8 µmolAl/$SiO_2$ and 2 µmolAl/$SiO_2$. CVD temperature is 700° C. for all data.

Carbon was deposited on both quarter- and full-monolayer Al (III) treated silicas, and the carbon load was adjusted by varying the reaction time. Both substrates showed increases in the carbon load with the time, but the increase is much faster with a full monolayer of Al (III). FIG. 3 compares the rate of carbon deposition on these substrates and on alumina. Evidently, the substrate with more Al (III) allows the carbon to deposit faster, though it is still slower than that of alumina. Moreover, on the silica treated with full-monolayer Al (III) carbon deposits with time in a manner more similar to alumina than to silica covered with the quarter-monolayer Al (III). Finally, FIG. 3 shows that there is a considerable change in the rate of deposition of carbon at short time.

The 2 μmol/m$^2$ of Al (III) treated silica requires about 32% carbon to fully cover the Al (III) layer; the 8 μmol/m$^2$ of Al (III) treated silica requires about 25% carbon. We hypothesize that the latter has more uniform coating and thus less is required to sequester the Al (III). We did not go beyond these carbon loadings; these carbon loadings should give maximum retentivity (Paek et al., *J. Chromatogr. A* 1217 (2010) 6475).

Example 5

Column Packing and Chromatographic Studies

The carbon packing material disclosed herein, and the C/ZrO$_2$ commercial materials, were packed by the same procedures described elsewhere (e.g., Stoll et al., *J. Chromatogr.* 1122 (2006) 123).

All chromatographic data were collected by using an HP 1090 LC system controlled by Chemstation software version A.10.01 (Agilent Technologies, Wilmington, Del., USA) and equipped with an autosampler, thermostatting column compartment and photodiode array UV detector. All solutes were detected at 210 nm. Column dead times were measured from retention time of acetone. All retention data given represent averages of triplicate runs.

Table 1 summarizes the repeatability of the chromatographic properties of several preparations of carbon phases deposited on 2 µmol/m$^2$ of Al (III) treated silica (C/2 µmol Al/SiO$_2$).

TABLE 1

Repeatability of the carbon deposition process.

|  | Batch 1 | Batch 2 | Batch 3 | Average | % RSD |
|---|---|---|---|---|---|
| % C (w/w)[a] | 31.6 | 29.5 | 30.7 | 30.6 | 3 |
| Plate (count/m)[b] | 45,800 | 46,300 | 52,400 | 48,200 | 8 |
| Symmetry[c] | 0.6 | 0.6 | 0.6 | 0..6 | 3 |
| k of nitrohexane[d] | 5.9 | 4.9 | 4.9 | 5.2 | 11 |
| k of toluene[e] | 1.3 | 1.4 | 1.5 | 1.4 | 7 |
| k of nitrobenzene[e] | 4.9 | 3.9 | 4.7 | 4.5 | 12 |

[a]16 hours at 700° C. with hexane as source.
[b]Plate count from nitrohexane.
[c]Symmetry based on nitrohexane, LC conditions: F = 0.4 ml/minute, T = 40° C.
[d]35/65 MeCN/water.
[e]50/50 MeCN/water; all packed in 33 × 2.1 mm i.d. column.

Figure 4:
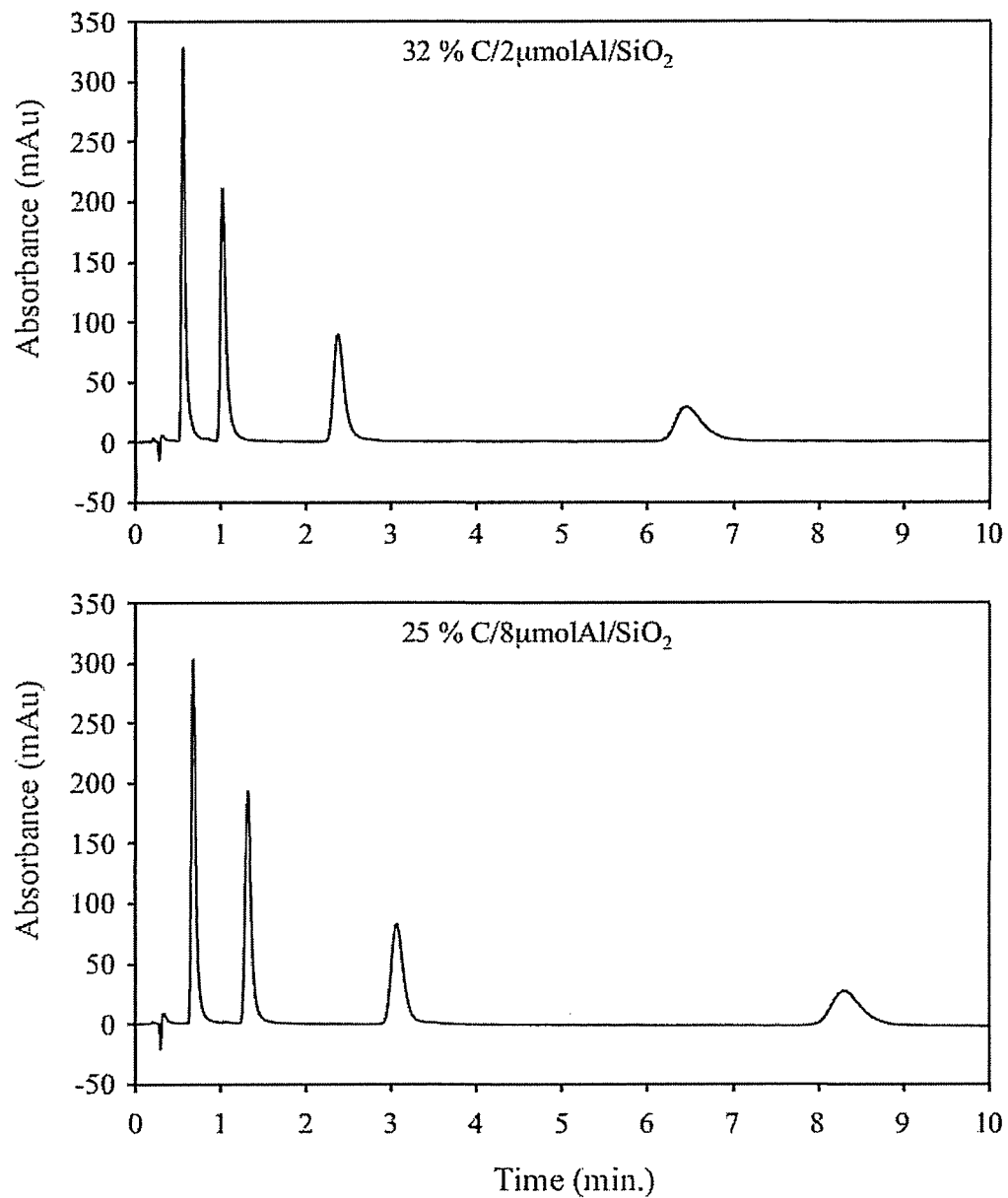
FIG. 4 is an illustration of chromatograms of embodiments for homolog series of nitroalkanes (nitropropane, nitrobutane, nitropentane, and nitrohexane). LC conditions: 20/80 MeCN/water, T=40° C., F=0.4 ml/minute. 33 2.1 mm id. column for both phases.

Three identical deposition runs gave an average of 30.6% (w/w) of carbon with only 3% standard deviation. The resulting materials were packed and evaluated by measuring the chromatographic efficiency and retention of nitrohexane, toluene and nitrobenzene. As shown in Table 1, this carbon phase gave reproducible efficiency (8% RSD) and retention (7-12% RSD). The plate count was obtained from nitrohexane as it provides the maximum value and the least peak tailing. FIG. 4 shows the chromatogram of a homolog series of nitroalkanes. We used about 32% (w/w) of carbon for the final product because this loading provided both the maximum retentivity and full sequestration of the Al (III) sites on silica; this was ascertained by used of benzoic acid as a probe for accessible Al (III) as per the method described elsewhere (Trammell et al., *Anal. Chem.* 73 (2001) 3323). For the same reasons, we finally deposited about 25% (w/w) of carbon on 8 µmol/m$^2$ of Al (III) treated silica. A chromatogram of the nitroalkanes on this material is shown in FIG. 4. This carbon phase gives higher efficiency (79,000 plate counts/m) than does 32% C/2 µmolAl/SiO$_2$. The reasonably good efficiency and peak shapes of nitroalkanes suggest that all these carbon phases are potentially useful as HPLC packing materials.

We expected based on our previous results for carbon deposited on alumina that the C/Al/SiO$_2$ should behave as a reversed phase. To confirm this, we plotted log k vs. the number of methylene groups (n$_{CH2}$) for a homolog series of nitroalkanes (see FIG. 5). Reversed phase behavior is clearly demonstrated by linear increase of log k with the number of methylene group. It seems that one monolayer of carbon (approximately 8%) is sufficient to convert silica to a reversed phase, but the retentivity of this material remains very low. As discussed below, we believe this must be due to the non-uniformity of the carbon cladding; more carbon is apparently needed to achieve a homogeneous outer layer of cladding.

From the slopes, we calculated the free energy of transfer per methylene group from the mobile to the carbon phase ($\Delta G_{CH2}$=-2.3BRT; B is the slope of the line in FIG. 5, R is the gas constant and T is the temperature) (Melander et al., *Chromatographia* 15 (1982) 86). As listed in Table 2, the free energy of transfer allows a quantitative comparison of the affinity of carbon phases to methylene groups.

TABLE 2

The slopes, intercept and $\Delta G_{CH2}$[a] obtained from different carbon phases.[d]

| Materials | Slope (β) | Intercept | R$^2$ | $\Delta G_{CH2}$ (cal/mol) |
|---|---|---|---|---|
| ODS[c] | 0.301 ± 0.001 | −0.712 ± 0.003 | 0.99999 | −431 ± 1 |
| C/ZrO$_2$ | 0.322 ± 0.002 | −1.349 ± 0.003 | 0.99995 | −461 ± 3 |
| 24% C/Al$_2$O$_3$[b] | 0.376 ± 0.003 | −1.02 ± 0.01 | 0.99986 | −538 ± 4 |
| 8% C/ 2 µmolAl/SiO$_2$ | 0.305 ± 0.001 | −1.49 ± 0.01 | 0.99986 | −437 ± 1 |
| 32% C/ 2 µmol Al/SiO$_2$ | 0.350 ± 0.002 | −1.33 ± 0.01 | 0.99986 | −501 ± 3 |
| 14% C/ 8 µmol Al/SiO$_2$ | 0.322 ± 0.002 | −1.34 ± 0.01 | 0.99990 | −475 ± 3 |
| 21% C/ 8 µmol Al/SiO$_2$ | 0.338 ± 0.002 | −1.24 ± 0.01 | 0.99987 | −484 ± 3 |
| 25% C/ 8 µmol Al/SiO$_2$ | 0.339 ± 0.002 | −1.21 ± 0.01 | 0.99986 | −486 ± 3 |

[a]The free energy of transfer per methylene group based on nitroalkane homolog series (see the description of FIG. 5 for LC conditions).
[b]Data obtained from Paek et al., *J. Chromatogr. A* 1217 (2010) 6475.
[c]Zorbax SB C18, uracil used for dead volume measurement, 50 × 2.1 mm i.d., column.
[d]The slope and intercept of the linear regression of log k vs. (n$_{CH2}$).

The affinity increases as we deposit more carbon on both Al (III) treated silicas. Table 2 indicates that with the exception of the 8% C/2 µmolAl/SiO$_2$ the different C/Al/SiO$_2$ materials are very similar in terms of both the slope and intercept. The slope of the 24% C/Al$_2$O$_3$ phase is clearly different although it has similar number of carbon layers (5 monolayers) as the 32% and 25% C/Al/SiO$_2$ (4-5 monolayers). The small differences in slope could easily result from, for example, different degrees of oxidation during synthesis, or perhaps from residual effects of the underlying substrate on retention. In fact, spectroscopic characterization (XPS and FT-IR) in the previous work did not detect any chemical difference of carbon between C/Al$_2$O$_3$ and C/ZrO$_2$, which showed bigger difference in the slope of log k vs n$_{CH2}$. As compared to the conventional octadecyl bonded silica (ODS) phase, all carbon phases exhibit higher slopes, thus stronger affinity for methylene groups. This is consistent with the observation that carbon phases give greater selectivity for a methylene group than do ODS phases (Weber et al., *Anal. Chem.* 67 (1995) 3042).

Figure 5:
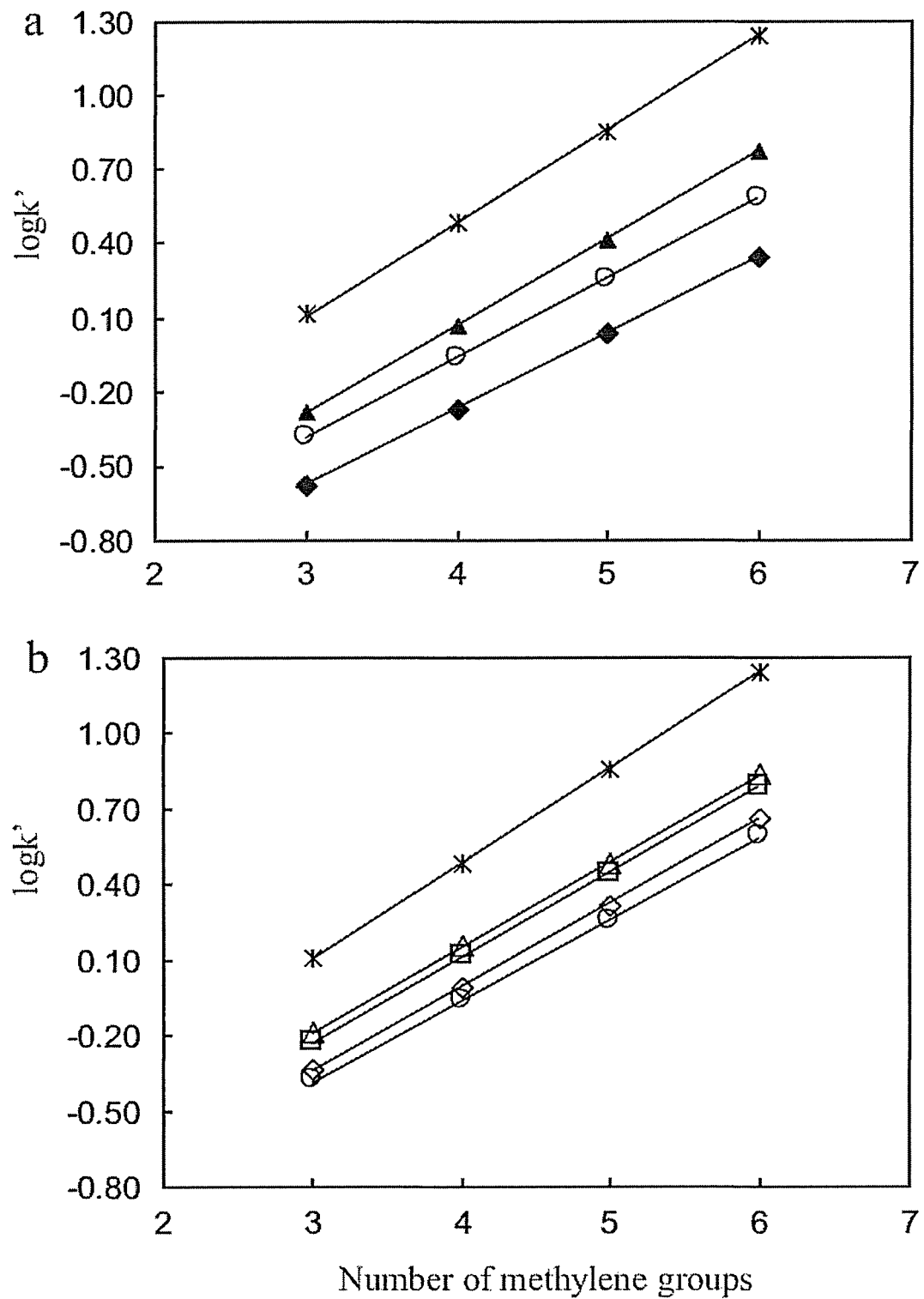
FIG. 5 is a graphical representation for embodiments plotting log k vs. number of methylene groups for nitroalkane homologs (nitro propane, nitrobutane, nitropentane, and nitrohexane). (a) 2 µmolAl/$SiO_2$: ($\blacktriangle$) 32%; ($\square$) 8% C; (b) 8 µmol Al/$SiO_2$: ($\Delta$) 25%; ($\square$) 21%; ($\diamond$) 14% C; ($\bigcirc$) C/$ZrO_2$; (*), 24% C/$Al_2O_3$. LC conditions: F=0.4 ml/min, T=40° C., 35/65 MeCN/water; all columns are 33 2.1 mm id. Error bars are not bigger than the markers in the plot.
Figure 6:
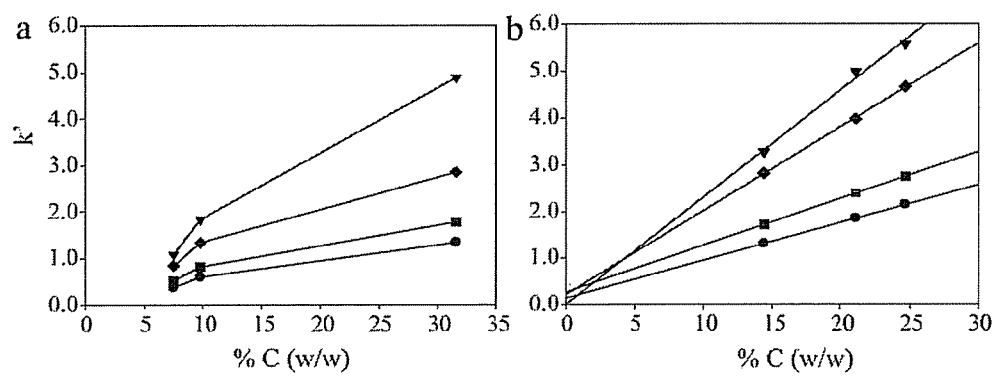
FIG. 6 is a graphical representation for embodiments plotting k vs. % C (w/w) for nitrobenzene ($\blacktriangledown$), p-xylene ($\blacklozenge$), ethylbenzene ($\blacksquare$), and toluene ($\bullet$). (a) 2 µmolAl/$SiO_2$; (b) 8 µmolAl/$SiO_2$, extrapolation in (b) is based on linear regression of all data points ($R^2$ for nitrobenzene, p-xylene, ethylbenzene, and toluene are 0.990, 0.999, 0.999 and 0.999, respectively). LC conditions: F=0.4 ml/minute, T=40° C., 50/50 MeCN/water; all columns are 33 2.1 mm id. Error bars are not bigger than the markers in the p lot.

As shown in both FIGS. 5 and 6, retentivity of C/Al/SiO$_2$ for all polar and nonpolar compounds used increases with increasing carbon loads on both substrates. This implies that increase of surface coverage by carbon with higher carbon loads since bare Al/SiO$_2$ surface does not retain these compounds. Interestingly, the pattern of the increase in retentivity, thus covering the surface with carbon is very different between 2 and 8 μmolAl/SiO$_2$ (see FIG. 6). The retention of all compounds increases almost linearly (R$^2$ of at least 0.990) with % C on the high Al/SiO$_2$ with a statistically zero or nearly zero (approximately 0.2) intercept based on least squares analysis. However, the increase is not constant with carbon loads on the low Al/SiO$_2$ showing non-zero intercept suggesting that a minimum amount of carbon is required before retention can be achieved. This comparison suggests that the surface is covered by the carbon more efficiently on the high Al/SiO$_2$, which may induce carbon deposition more uniformly on the surface than the low Al/SiO$_2$.

Example 6

Physical Characterization

Pore Size Distribution

Table 3 summarizes the pore parameters for materials made with different carbon loads.

TABLE 3

Characteristics of different carbon loads on Al/SiO$_2$.

| CVD condition | % C (w/w) | Carbon$^a$ (μmol/m$^2$) | Hypothetical carbon thickness$^a$ (monolayers) | $S_{BET}$$^b$ (m$^2$/g) | Pore volume$^c$ (cm$^3$/g) | Nominal BET pore diameter$^d$ (nm) |
|---|---|---|---|---|---|---|
| SiO$_2$ | n/a | n/a | n/a | 211 | 0.79 | 15.0 |
| 2 μmol Al/SiO$_2$ | n/a | n/a | n/a | —$^e$ | — | — |
| 700° C., 6 hours | 8 | 30 | 1.1 | 183 | 0.64 | 14.0 |
| 700° C., 16 hours | 32 | 125 | 4.8 | 115 | 0.33 | 11.3 |
| 8 μmol Al/SiO$_2$ | n/a | n/a | n/a | 180 | 0.68 | 15.1 |
| 700° C., 6 hours | 14 | 67 | 2.5 | — | — | — |
| 700° C., 8 hours | 21 | 98 | 3.7 | 149 | 0.47 | 12.6 |
| 700° C., 11 hours | 25 | 144 | 4.4 | 147 | 0.43 | 11.7 |

$^a$See Pack et al., *J. Chromatogr. A* 1217 (2010) 6475.
$^b$Surface area (S$_{BET}$).
$^c$Pore volume obtained from single total pore volume less than 217, 254, 222, 131, 386, and 123 nm diameter at P/P$_o$ of 0.991, 0.992, 0.991, 0.985, 0.995, and 0.984, respectively (from top to bottom).
$^d$Nominal pore diameter of an equivalent single cylinder, calculated by 4 × (pore volume)/S$_{BET}$.
$^e$As 4 and 8 μmolAl/SiO$_2$ hardly affect the original pore structure of SiC$_2$, the data for 2 μmol Al/SiO$_2$ was not obtained.

Both the surface areas and pore volumes decrease upon increasing the carbon load. However, the area loss per % C is much less when a higher amount of Al (III) is adsorbed on the silica; the silica with 8 μmol/m$^2$ Al (III) loses approximately 1.5 m$^2$/g per % C, compared to approximately 3.5 m$^2$/g per % C on the silica with only 2 μmol/m$^2$ Al (III). We infer that the higher Al (III) treatment induces a more efficient and uniform carbon deposition, which is consistent with the observation that higher retentivity is achieved with lower carbon loading on 8 μmol/m$^2$ of Al (III) treated silica.

Neither substrate gave an absolutely uniform carbon deposition; both require much more than a theoretical monolayer of carbon to achieve maximum retentivity. Assuming that the carbon is graphitic and coated uniformly, we calculated the number of carbon monolayers from the BET data and the known weight of the carbon for each material as shown in Table 3. Theoretically, the % C required to form one monolayer is about 7% (w/w). However, as mentioned above, about 32% and 25% of carbon are needed for the low and high levels of Al (III) treatments of silica respectively to obtain maximum retentivity and to fully sequester the Al (III) sites on the silica. These carbon loads correspond to about 4-5 carbon monolayers which strongly suggests that carbon deposition is not homogeneous. That is, we believe that carbon deposition does not proceed monolayer by monolayer, which is, in fact, commonly observed from deposition of pyrolytic carbon (Bourrat et al., *J. Braz. Chem. Soc.* 17 (2006) 1090). However, this result is rather similar to the number of monolayers we had to put on alumina for its full coverage of the substrate. It should also be noted that the C/ZrO$_2$ required about 8% (w/w) of carbon to ensure complete coating of the surface so that all solute access to the ZrO$_2$ substrate was blocked; this is equivalent to about 11 monolayers of carbon on this low surface area material.

Figure 7:
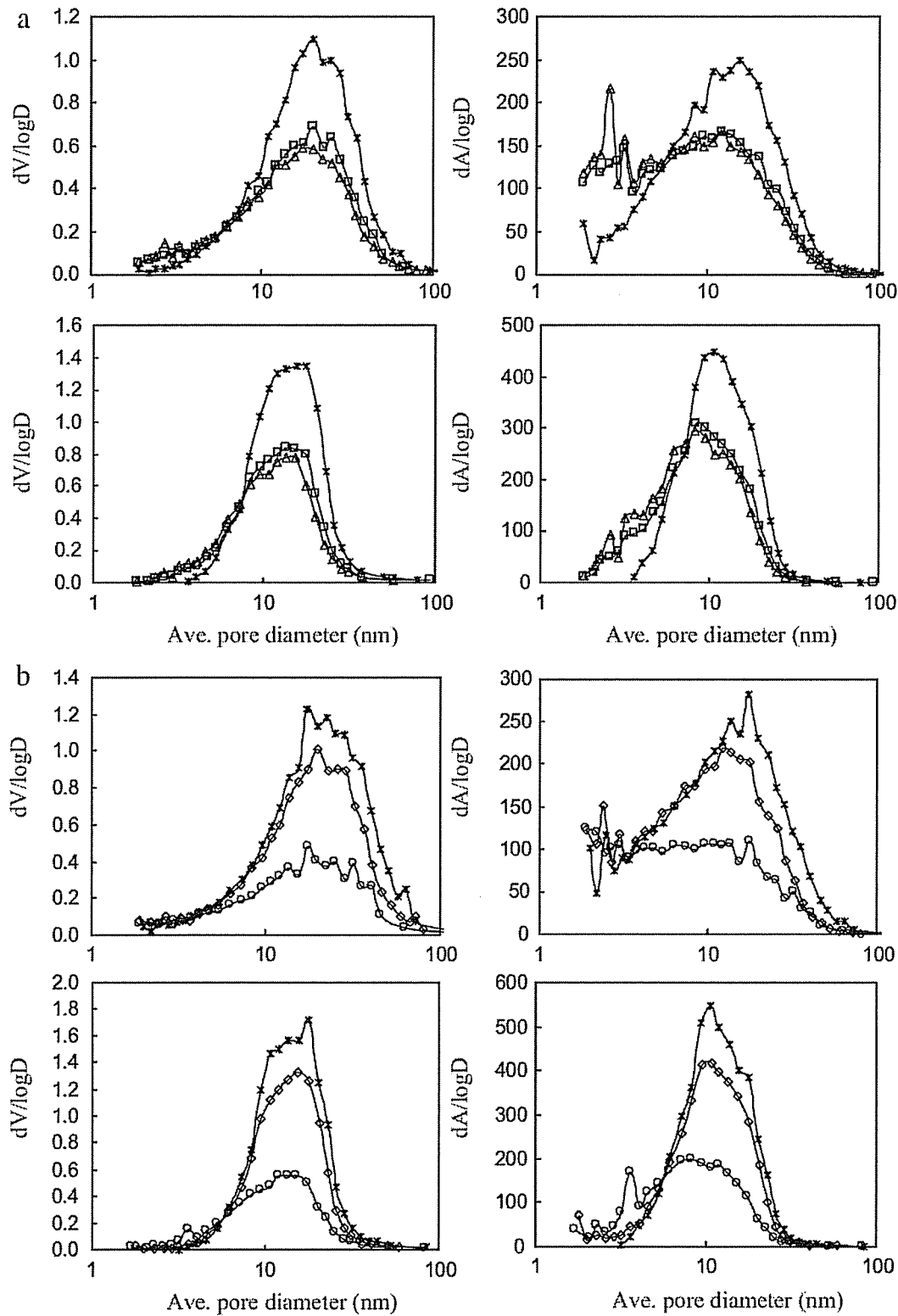
FIG. 7 is a graphical representation of embodiments showing (a) differential pore volume and area distributions for various carbon loads on 2 µmolAl/$SiO_2$ computed by the BJH method from nitrogen adsorption (upper) and desorption (lower). (*) bare $SiO_2$; ($\diamond$) 8% C; ($\bigcirc$) 32% C; and (b) differential pore volume and area distributions for various carbon loads on 8 µmolAl/$SiO_2$; adsorption (upper) and desorption (lower); (*) bare 8 µmolAl/$SiO_2$; ($\square$) 21% C; ($\Delta$) 25% C.

To estimate the pore size distributions, pore area and volume distributions curves based on nitrogen adsorption and desorption were computed using the BJH method. As shown in FIG. 7, different levels of Al (III) on silica surface induce carbon deposition in a very different fashion. It is possible that when too little Al (III) is used, carbon forms with a significant induction delay (see FIG. 3) and in a "patchier" manner, leaving uncoated Al/SiO$_2$ surface. When a monolayer of Al (III) is used, carbon is deposited without so much induction delay, and with a more uniform covering of the surface. This cladding must still be rough enough, though, to produce a texture that shows up as new area with a small apparent pore size; these new small pores may just be the nanoscale texture of the rough, but uniform, carbon coating.

Resistivity

The resistivities of the carbon materials on different substrates are compared in Table 4. The materials include graphite and carbon phases on the various oxides. Since carbon is conductive and silica is not, we expect that those materials with a lower fraction of silica covered by carbon will have higher resistivity due to less continuous carbon layers.

TABLE 4

Electrical resistance of various carbon materials.$^a$

| Materials | Log (resistance Ω)$^b$ |
|---|---|
| 32% C/Al/SiO$_2$ | 2.6 ± 0.1 |
| 25% C/Al/SiO$_2$ | 1.9 ± 0.1 |
| 24% C/Al$_2$O$_3$ | 2.12 ± 0.07 |
| C/ZrO$_2$ | 3.35 ± 0.08 |
| Graphite | 2.20 ± 0.05 |

$^a$For the calculation of the resistance, see Paek et al., *J. Chromatogr. A* 1217 (2010) 6475.
$^b$Average of triplicate measurement.

Both materials studied here have as low a resistivity as that of carbon on alumina. As these carbon coated materials have about the same number of carbon monolayers and are prepared at the same temperature, this result implies a high coverage of the silica by carbon. It should be noted that the 25% carbon loaded material shows resistance comparable to 32% carbon, which may again suggest a more efficient carbon deposition on the high Al (III) treated silica. The similarity in the resistivity of these carbon clad materials to that of graphite indicates a considerable degree of sp$^2$ hybridization of the carbon. Low resistivity also implies high polarizability of carbon surface, which should enhance retentivity (Engel et al., *Anal. Chem.* 65 (1993) 3691).

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing silica particles having a metal adsorbed thereon, the method comprising:
   dispersing silica particles in an aqueous liquid having a pH of less than or equal to 7;
   adding a soluble source for one or more metal cations to the aqueous liquid having the silica particles dispersed therein; and
   increasing the pH of the aqueous liquid with the metal cations and the silica particles dispersed therein sufficiently slowly to provide homogeneous precipitation of the metal on a surface of the silica particles and form the silica particles having the metal adsorbed thereon.

2. The method of claim 1 wherein the silica particles having the metal adsorbed thereon are formed through molecular adsorption from homogeneous solution.

3. The method of claim 1 wherein the silica particles are dispersed in an aqueous liquid having a pH of less than or equal to 4.

4. The method of claim 1 further comprising efficient mixing of the aqueous liquid during one or more of the method steps.

5. The method claim 1 wherein the one or more metal cations comprise rare earth cations, transition metal cations, post-transition metal cations, or combinations thereof.

6. The method of claim 1 wherein the one or more metal cations comprise cationic Al, Zr, Fe, or combinations thereof.

7. The method of claim 1 wherein the source for the one or more metal cations further comprises one or more inorganic anions.

8. The method of claim 7 wherein the one or more inorganic anions are selected from the group consisting of halides, nitrates, sulfates, and combinations thereof.

9. The method of claim 1 wherein the source for the one or more metal cations further comprises one or more organic anions.

10. The method of claim 9 wherein the one or more organic anions are selected from the group consisting of formates, carboxylates, and combinations thereof.

11. The method of claim 1 wherein increasing the pH of the aqueous liquid comprises:
    adding urea to the aqueous liquid with the metal cations and the silica particles dispersed therein; and
    heating the aqueous liquid with the urea to form ammonia.

12. The method of claim 1 further comprising separating and/or drying the silica particles having the metal adsorbed thereon.

13. A method of preparing carbon coated silica particles, the method comprising:
    preparing silica particles having a metal adsorbed thereon by a method according to claim 1; and
    depositing carbon on the silica particles having the metal adsorbed thereon using a chemical vapor deposition process.

14. The method of claim 13 wherein the chemical vapor deposition process comprises contacting the silica particles having the metal adsorbed thereon with an organic vapor under conditions effective to form the carbon coated silica particles.

15. The method of claim 14 wherein the organic vapor comprises one or more hydrocarbons.

16. The method of claim 13 wherein conditions effective comprise a temperature of at least 500° C.

17. The method of claim 13 wherein conditions effective comprise a temperature of at least 600° C.

18. The method of claim 13 wherein conditions effective comprise a temperature of at least 700° C.

19. The method of claim 13 wherein the organic vapor comprises a C1-C12 hydrocarbon.

20. The method of claim 13 wherein the organic vapor comprises hexane.

21. A silica particle having a metal adsorbed thereon prepared by the method of claim 1.

22. A carbon coated silica particle prepared by the method of claim 13.

* * * * *